(12) United States Patent
Acuna Goycolea et al.

(10) Patent No.: US 11,220,437 B2
(45) Date of Patent: Jan. 11, 2022

(54) PROCEDURE FOR OBTAINING SCORODITE WITH A HIGH ARSENIC CONTENT FROM ACIDIC SOLUTIONS WITH HIGH CONTENT OF SULFURIC ACID

(71) Applicant: EcoMetales Limited, Providencia (CL)

(72) Inventors: Marcelo Gustavo Acuna Goycolea, Las Conde (CL); Enrique Anselmo Roman Espinoza, La Florida (CL); Ricardo Miguel Pezoa Conte, Paine (CL)

(73) Assignee: EcoMetales Limited, Providencia (CL)

( * ) Notice: Subject to any disclaimer, the term of this patent is extended or adjusted under 35 U.S.C. 154(b) by 118 days.

(21) Appl. No.: 16/721,436

(22) Filed: Dec. 19, 2019

(65) Prior Publication Data

US 2020/0198985 A1 Jun. 25, 2020

Related U.S. Application Data

(60) Provisional application No. 62/784,628, filed on Dec. 24, 2018.

(51) Int. Cl.
| | |
|---|---|
| *C02F 1/52* | (2006.01) |
| *C01G 49/00* | (2006.01) |
| *C02F 1/70* | (2006.01) |
| *C02F 1/72* | (2006.01) |
| *C02F 101/10* | (2006.01) |
| *C02F 103/10* | (2006.01) |
| *C02F 103/34* | (2006.01) |

(52) U.S. Cl.
CPC ..... *C01G 49/0018* (2013.01); *C01G 49/0009* (2013.01); *C02F 1/5236* (2013.01); *C02F 1/70* (2013.01); *C02F 1/72* (2013.01); *C02F 2101/103* (2013.01); *C02F 2103/10* (2013.01); *C02F 2103/34* (2013.01)

(58) Field of Classification Search
CPC .......................... C01G 49/0018; C02F 1/5236
See application file for complete search history.

(56) References Cited

U.S. PATENT DOCUMENTS

| | | | |
|---|---|---|---|
| 5,820,966 | A | 10/1998 | Krause et al. |
| 7,695,698 | B2 | 4/2010 | Fujita et al. |
| 2017/0145540 | A1 | 5/2017 | Bartsch et al. |

FOREIGN PATENT DOCUMENTS

| | | |
|---|---|---|
| CA | 2927033 A1 | 10/2017 |
| CN | 103553197 B | 12/2014 |
| FI | 118802 B | 8/1998 |

OTHER PUBLICATIONS

D. Filippou, et al; Arsenic immobilization by controlled scorodite precipitation; JOM; Dec. 1997; 1;49(12); pp. 52-55.

*Primary Examiner* — Peter Keyworth
(74) *Attorney, Agent, or Firm* — Lucas & Mercanti, LLP (57) ABSTRACT

The present invention provides a process that allows the oxidation of trivalent arsenic and ferrous ion, simultaneous with neutralization of the acid solution to be treated, the precipitation of arsenic and oxidized ferric iron added in a molar ratio Fe:As determined at a defined pH, all of the above with a high efficiency of precipitation of arsenic as ferric arsenate or scorodite, obtaining a final residue stable in the long term, characterized by their higher content of arsenic in a lower volume compared with the procedures described in the state of the prior art.

12 Claims, 7 Drawing Sheets

PROCEDURE FOR OBTAINING SCORODITE WITH A HIGH ARSENIC CONTENT FROM ACIDIC SOLUTIONS WITH HIGH CONTENT OF SULFURIC ACID

CROSS REFERENCE TO RELATED APPLICATION

This application claims the benefit of priority of U.S. Provisional Patent Application No. 62/784,628, filed on Dec. 24, 2018, application which is incorporated herein in its entirety for all purposes.

FIELD OF THE INVENTION

The invention relates to a procedure for the generation of scorodite (hydrated iron arsenate) of high arsenic content which is applicable to the industrial processing of effluents or aqueous solutions with high content of arsenic, which can come from a plurality of procedures for the treatment of mining waste of different kinds, from which you get arsenic in solution as main impurity which requires a method of separation and stabilization in the long term. The result of this procedure, apart from the production of the generation of a precipitate of scorodite with high arsenic content, is an aqueous solution impoverished in arsenic.

STATE OF THE ART

Chilean patent application 201000202 relates to a process for abatement of arsenic and antimony for environmental stabilization of liquid effluents and solid wastes with high levels of arsenic and antimony, where the procedure includes the stages of leaching foundry dust, Oxidize As(III) present in the leach solution to As (V), submit a fraction of the rich current for adjusting the molar ratio of Fe(III) over As(V) in the order of 1 to 2, and submit both the rich current as the liquid coming from the stage of adjustment of Fe(III):As(V), precipitation in the achievement of two agitated reactors where the pH level of the solution is changed incorporating neutralizing agents and then is passed to an intermediate stage of separation of solids/liquids, where a liquid stream free of arsenic (As) and rich in Cu that becomes a process of electro obtaining is obtained and a solid, stabilized in the form of scorodite and gypsum.

The Chilean patent application 201000202 does not solve the technical problem of the present invention, it makes use of neutralizers that form a plaster, which reduces the content of arsenic in the solid final. In particular, claim 15 points out that the neutralization steps involve neutralizing the pulp in a first reactor at a pH of 1.0, and in a second reactor at a pH of 1.5. The pH of 1.5 represents an extensive neutralization of the pulp, which causes it to generate an excessive amount of gypsum, which reduces the content of arsenic in the solid.

The patent CN103553197B teaches about a method for the removal of arsenic using metallurgical slag. In particular, it contacts a solution containing arsenic and antimony with slag and an oxidizing agent, in order to promote the adsorption of arsenic and antimony in the slag, at conditions of temperature between 40 and 100° C. with a residence time of between 1 and 3 h. Within the oxidizing agents that can be used, the document highlights hypochlorite, chlorates and chlorine dioxide. Subsequently, there is a stage of neutralization at pH 6 to 9, where, among others, you can use magnesium oxide or sodium carbonate.

The patent CN103553197B does not solve the same problem of the technique of the present invention, since it does not produce a solid containing arsenic containing high concentrations of arsenic. More interestingly, the patent CN103553197B moves away from the present invention since it does not produce scorodite or ferric arsenate as a way to stabilize the arsenic, but it adsorbs to slag which includes ferrous minerals. Similarly, the fact of adding slag as a surface of adsorption of arsenic and antimony on its surface indicates that the solid obtained does not have a high arsenic content. In particular, the solid obtained by means of the technology of the present invention has a arsenic content higher than 15%, which also results in a reduced amount of solids generated compared to those generated by the patent CN103553197B. Although the patent CN103553197B makes use of chlorinated oxidants, the document does not teach about the oxidation of As(III) and Fe(II) with the aim of forming scorodite of high arsenic content. In addition, the use of high ranges of pH in the presence of acidic solutions generates a quantity of plaster high in the case of neutralization with calcium-based neutralizing antibodies, which also moves away from the goal of producing scorodite of high arsenic content.

The document Jom. 1997 Dec. 1; 49(12):52-5 teaches about the production of scorodite through precipitation of arsenic in different stages. The document points out that it is possible to obtain scorodite at a temperature of 90° C. using the oxidation of arsenite ion to arsenate ion using hydrogen peroxide as the oxidizing agent. Subsequently, the solution is treated in different stages where arsenic is precipitated at different pH by adding different doses of neutralizer, resulting in the production of scorodite. This document does not teach about the conditions necessary to maximize the content of arsenic in a precipitate which contained scorodite. The disclosed process mentions the processing of a solution with a weak acid, with a precipitation that starts at pH 0.5 and ends with a neutralization at pH 4.0. Although the invention does not mention the arsenic content in the final precipitate, the high quantity of oxide of calcium or lime, which is necessary in order to raise pH 1.5 to pH 4.0 makes it likely that the amount of arsenic in the final precipitate is less due to the formation of gypsum. In contrast, the present invention benefits from the use of an oxidizing agent that allows at the same time efficiently oxidizing arsenite ion. This allows producing a precipitate of arsenic with a content of this contaminant element in the final residue higher than those reported in the state of the art submitted.

The document U.S. Pat. No. 7,695,698 B2 reports a method to produce a compound of arsenic-iron that consists of adding an oxidizing agent to an aqueous solution containing ions of arsenic and bivalent ions of iron and allows a reaction of precipitate compound of arsenic-iron that proceeds under agitation of the solution, where the oxidizing agent, which is oxygen or air, is added to the solution by injection or bubbling either constant or intermittent, while the reaction of precipitation proceeds under agitation of the solution at room temperature between 50 and 100° C. in a pond under atmospheric pressure and is finished in a range of pH between 0 and 12. By studying the ranges of pH and free acidity at the beginning of the precipitation of the document U.S. Pat. No. 7,695,698 B2, it can be seen that for starting solutions of less than or equal to 0.5 pH (acidity of over 34.5 g/L), the solution obtained post-precipitation has arsenic concentrations of between 1.2 to 7.02 g/L (see examples 6-2, 9, 12, 13, 15, 16 and 18 in Table 6), a value that is considered a high concentration at industrial level. While the arsenic content of the precipitate for solids obtained for starting solutions of below pH 0.5 has content between 27.5 and 31.8% of As, the efficiencies of precipitation of arsenic hover around 64.9% between and 27. Therefore, the teachings of the document U.S. Pat. No. 7,695,698 B2 are not conclusive as to precipitate scorodite with high arsenic content and high efficiency so as to produce a solution with a concentration of arsenic below 1.0 g/L. What is disclosed in this document, is that for an arsenic solution at pH above 1.0 (12.4 g/L free acidity) it only requires a temperature and an adequate reaction time to produce ferric arsenate with a high arsenic content, getting a solution of arsenic concentration of less than 1.0 g/L, providing an appropriate amount of iron. In contrast, this invention does teaches how to obtain a ferric arsenate with high arsenic content from strongly acidic solutions, where the combination of selection of an oxidizer and appropriate neutralizing agent allows optimizing the content of arsenic in such material precipitate, without sacrificing the efficiency of precipitation that translates into obtaining a solution treated with an arsenic concentration of less than 1.0 g/L.

The document FI 118802 B discloses a method for removing arsenic from solutions containing sulfur dioxide, which comprises the steps of introducing an aqueous solution in a reactor of oxidation, where the aqueous solution contains iron, arsenic and sulfur dioxide; oxidize the iron, arsenic and sulfur dioxide contained in the aqueous solution; sow such aqueous solution containing oxidized iron, arsenic and sulfur dioxide with a neutralized precipitate; neutralize such aqueous solution is seeded with a base that contains calcium to precipitate the neutralized precipitate, the neutralized precipitate includes compounds of ferric arsenate; and recycle a portion of such neutralized precipitate to said step of sowing. The molar ratio of iron/arsenic must be at least 2, and the pH of neutralization of at least 7. Under such conditions, and in function of a neutralization with a base that contains calcium, there will inevitably be the generation of plaster, so the content of arsenic in the solid precipitate will be very low. In this sense, the document FI 118802 B2 does not teach how to precipitate stable scorodite from strongly acidic solutions.

The patent application CA2927033A1 reports a method of stabilization of arsenic to produce scorodite using sodium hypochlorite as oxidant. This application, however, does not teach which is the consumption of oxidant per unit mass ratio of arsenic, nor what was the remnant of the arsenite ion concentration in solution once added to the solution of sodium hypochlorite.

Subsequently, in the same paragraph 20, it is noted that, in the oxidized solution the molar relation of Fe/As is adjusted to 2.0 and that the pH of the solution is increased to 5.0 by the addition of sodium hydroxide to precipitate ferric arsenate. The document does not refer to how long or what temperature ferric arsenate is precipitated, conditions that are relevant for claiming the formation of scorodite. The scorodite precipitates in the molar ratios of Fe/As close to 1 and temperatures above 50° C. In addition, the formation of scorodite is a process that at room temperature has very slow kinetics, so that high residence times and, consequently, equipments of great dimensions would be needed. In order to increase the speed of reaction, precipitation temperatures greater than 50° C. are required to precipitate scorodite in times of less than 48 h.

The patent application US20170145540A1 teaches about a process of alkaline leaching of copper concentrates, producing a leach solution containing arsenic and antimony, leaving the copper in the solid. Subsequently, the leach solution containing arsenic and antimony is subjected to a precipitation process, where the arsenic and antimony are removed and the alkaline solution lixiviant is recovered for leaching of fresh copper concentrate. The patent application US20170145540A1 differs from the present invention in that arsenic is present in copper concentrates and undergoes a phase of alkaline leaching to leach arsenic and antimony, and in such conditions such elements are removed.

Technical Problem

The technical problem lies in the fact that today there is no procedure by which a final residue containing stabilized scorodite with a high arsenic content, higher than 15% from highly acidic solutions greater than 30 g/L of free acidity or pH below 1.0.

The advantages of the present invention are, first, the generation of a precipitate of scorodite with a high amount of arsenic in the generated precipitate, and second, the use of a reactive oxidation which allows to efficiently oxidize arsenite ion to arsenate ion in the presence of strongly acidic solutions and containing copper.

The solutions provided in the state of the technique allow precipitating scorodite by using neutralizing agents based on calcium, such as lime and limestone, which neutralize the acid producing gypsum, which is insoluble in acid conditions which co-precipitate with the ferric arsenate, generating a precipitate of low arsenic content with a high volume final residue that has an impact on their costs of transportation and disposal in dedicated landfills.

On the other hand, the oxidation with sodium chlorite directly in the acid solution with high arsenic content or in a stabilized solution in sodium hydroxide, containing oxidizing oxychlorinated species at chemical equilibrium, such as chlorite, chlorate and chlorine dioxide, (solution free of molecular chlorine), is able to oxidize arsenite ion into arsenate ion and simultaneously neutralize the arsenic-containing solution or effluent, more efficiently than the technical solutions provided in the prior art.

The oxidation with hydrogen peroxide is carried out through the following chemical reactions:

$$H_3AsO_3+H_2O_2 \rightarrow H_3AsO_4+H_2O$$

$$2FeSO_4+H_2SO_4+H_2O_2 \rightarrow Fe_2(SO_4)_3+2H_2O$$

The molar efficiency of these relationships points out that for each mole of hydrogen peroxide are oxidized two moles of ferrous ion and one mole of arsenite ion.

In the case of sodium chlorite, this reagent in the presence of an excess of chloride ion, produces chlorine dioxide in accordance with the following reaction:

$$5NaClO_2+2H_2O \rightarrow 4ClO_2+NaCl+4NaOH$$

From this reaction, it is clear that the addition of sodium chlorite will generate a neutralizing effect of the solution to produce soda, which in turn is beneficial for the reaction of precipitation of scorodite which must be performed at a slightly higher pH. In this reaction, chlorine dioxide is the oxidizing agent of species of arsenic and iron, which is carried out by means of the following reactions of oxidation-reduction:

$$NaClO_2+2HAsO_2+2H_2O \rightarrow NaCl+2H_3AsO_4$$

$$NaClO_2+4FeSO_4+2H_2SO_4 \rightarrow 2Fe_2(SO_4)_3+NaCl+2H_2O$$

In particular, a molar ratio of sodium chlorite ion:aresenite ion of 1.41 allows oxidizing an 81% of the arsenite ion present in solution, while a molar ratio of hydrogen peroxide:arsenite ion of 12 allows a oxidizing a 78% of the arsenite ion. In the case of the oxidation of ferrous ion, the situation is even more advantageous for sodium chlorite, where a molar ratio of sodium chlorite:ferrous ion of 0.25 allows oxidizing a 75 percent of the ferrous ion, while a molar ratio of hydrogen peroxide:ferrous ion of 2.84 allows oxidizing a 83 percent of the ferrous ion. As a result, the sodium chlorite is a much more efficient oxidizer compared to the peroxide. Those knowledgeable in the technique will know that the oxidation with gases such as sulfur dioxide and oxygen where the solubility of these gases is lower, the molar requirements are much higher in comparison with sodium chlorite.

The reason that hydrogen peroxide is more inefficient as an oxidant that sodium chlorite in hydrometallurgical solutions is given by the presence of copper sulphate in solution, breaking-down hydrogen peroxide catalytically impacting the stoichiometric amount due to high consumption that indicate the chemical reactions listed above.

In summary, the novel and inventive aspects of the present invention are the following:

1. Oxidation of trivalent arsenic and ferrous ion, simultaneous with neutralization of the acid solution to be treated, through a reagent prepared in situ that contains basic medium of chemical oxychlorated species, chlorine dioxide, and without free chlorine. This procedure allows obtaining a final stabilized residue with high arsenic content of low volume.

2. Precipitation of oxidized arsenic and ferric iron added in a determined molar ratio Fe:As at defined pH, adding neutralizers such as magnesium carbonate or a mineral of magnesite or dolomite. A final residue of stabilized arsenic, is obtained in this procedure, in the long term as scorodite or ferric arsenate, such residue being characterized in presenting a high arsenic content and with a lower volume in comparison with the procedures established in the state of the art.

3. The process defined in this invention achieves high efficiency of precipitation of arsenic as ferric arsenate or scorodite, obtaining a final residue stable in the long term, characterized by their higher content of arsenic in a lower volume compared with the procedures described in the state of the art

SUMMARY OF THE INVENTION

The invention discloses a procedure for obtaining a mining or industrial waste, comprising ferric arsenate and/or scorodite with a high arsenic content from highly acidic solutions, superior in concentration of acid to 45 g/L, which include arsenic and optionally copper, iron, antimony and/or bismuth, considering that a solution rich in arsenic is a concentration greater than 7 g/L, in that the procedure comprises the following stages:

i.—Contact a highly acidic solution rich in arsenic, and optionally containing iron, with a neutralizing slurry so that the acid concentration of the resulting solution is of at least 35-45 g/L, to obtain a solution reduced in acid and rich in arsenic, and optionally containing iron, and a solid that includes plaster with low arsenic content, ii.—contacting said solution reduced in acid and rich in arsenic, and optionally including iron, with an oxidant that simultaneously oxide arsenite ion in the arsenate ion and oxide the ferrous ion to ferric ion, iii.—contact a highly acidic solution rich in arsenic, and optionally including iron, with a second oxidizer that simultaneously oxide arsenite ion in the arsenate ion and oxide the ferrous ion to ferric ion, iv.—regulating the molar ratio of ferric ion:arsenate ion, in the highly acid solution, between 1.0 and 2.0, by the addition of a volume of a solution of ferric ion, such as a leach solution of a material that contains iron, for this molar ratio, v.—add a portion of a 30% ferric arsenate and/or scorodite to the reduced acid solution, as basis of nucleation and growth of particle size of ferric arsenate and/or scorodite during its precipitation, vi.—heat the highly acidic solution at a temperature between 50 and 90° C., vii—Add a neutralizing slurry based on magnesium and calcium, until reaching a concentration of free acid of between 5 and 33 g/L, to generate a pulp comprising a neutralized highly acidic solution, ferric arsenate and/or scorodite and with low content of gypsum, as, for example, less than 54% of gypsum;

viii.—Maintain the pulp at the temperature indicated in step vi for a time of between 5 and 48 h, ix. Send the pulp to a stage of solid liquid separation for obtaining a first stream of a solid comprising ferric arsenate and/or scorodite with an arsenic content higher than 15% and content of less than 54% plaster and a second stream comprising the neutralized highly acidic solution and impoverished in arsenic, x.—recirculating a part of the solid comprising ferric arsenate and/or scorodite to stage iii.

In a preferential option, the pulp of neutralizer of stage i consists of calcium hydroxide slurry.

In an even more preferential option, the pulp of neutralizer is added at room temperature.

In a preferential option, in stage II the oxidizer used is hydrogen peroxide.

In a preferential option, in stage iii the oxidizer used is sodium chlorite.

In an even more preferential option, in stage ii hydrogen peroxide is added in such a way as to oxidize between a 0.1 to a 40 percent of the arsenic in the solution reduced in acid and rich in arsenic.

In an even more preferential option, in stage iii sodium chlorite is added in such a way as to oxidize between a 60% and 99.9% of the arsenic in the solution reduced in acid and rich in arsenic.

In a preferential option, in stage iv the ratio of ferric ion:arsenate ion is set to 1.2.

In an even more preferential option, the ratio of ferric ion:arsenate ion is adjusted with a solution rich in ferric ion which comes from a leach solution of magnetite and/or hematite.

In a preferential option, the slurry of phase vii contains between 0.1% to 47% by weight of calcium carbonate and a 53% to 99.9% by weight of magnesium carbonate.

In an even more preferential option, the slurry of stage vii is dolomitic limestone.

DETAILED DESCRIPTION OF THE INVENTION

The following examples should be considered as embodiments of the present invention, and in no case should be considered as constraints of the invention, as the different adaptations that can be made of the same will be covered within the claimed subject matter by this invention.

Example 1

300 mL were placed in an acid solution containing 55 g/L of sulfuric acid at pH 0.49, with a ferrous ion concentration of 9.27 g/L, a concentration of arsenite ion of 1.93 g/L and a copper concentration of 45 g/L, in a beaker of 500 mL stirring at 300 rpm at room temperature, to which a fixed amount of sodium chlorite was added. The mixture is kept in constant agitation during 30 min and then the concentration of arsenite ion and ferrous ion measured in solution using volumetric analysis with sulphate of cerium(IV) tartrate tetrahydrate 0.1 N from Merck.

The results of the various tests are presented in Table 1

| Ratio $NaClO_2/$ As(III) g/g | Concentration, ppm | | Oxidation efficiency, % | | |
|---|---|---|---|---|---|
| | $As^{3+}$ | $Fe^{2+}$ | $As^{3+}$ | $Fe^{2+}$ | Final pH |
| 0.48 | 1.26 | 7.18 | 35% | 23% | 0.52 |
| 0.62 | 1.14 | 6.95 | 41% | 25% | 0.55 |
| 0.73 | 0.96 | 6.77 | 50% | 27% | 0.58 |
| 0.90 | 0.57 | 5.57 | 70% | 40% | 0.67 |
| 1.36 | 0.37 | 4.74 | 81% | 49% | 0.76 |
| 1.51 | 0.37 | 4.03 | 91% | 57% | 0.77 |
| 1.66 | 0.13 | 2.94 | 93% | 68% | 0.75 |
| 1.81 | 0.09 | 2.35 | 95% | 75% | 0.76 |
| 1.96 | 0.04 | 1.46 | 98% | 84% | 0.66 |
| 2.11 | 0.04 | 1.06 | 98% | 89% | 0.81 |
| 2.27 | 0.04 | 0.55 | 98% | 94% | 0.76 |
| 3.01 | 0.05 | 0.55 | 97% | 94% | 0.75 |

Example 2

300 mL of an acid solution containing 55 g/L of sulfuric acid at pH 0.49, with a ferrous ion concentration of 9.27 g/L, a concentration of arsenite ion of 1.93 g/L and a copper concentration of 45 g/L, were placed in a 500 mL beaker stirring at 300 rpm at room temperature, to which a fixed amount of sodium chlorite was added. The mixture is kept in constant agitation during 30 min and then the concentration of arsenite ion and ferrous ion in solution is measured using volumetric analysis with sulphate of cerium(IV) tartrate tetrahydrate 0.1 N from Merck.

The results of the various tests are presented in Table 2.

| Ratio $NaClO_2/$ As(III) g/g | Concentration, ppm $As^{3+}$ | Oxidation efficiency, % $As^{3+}$ |
|---|---|---|
| 0.08 | 8.68 | 11% |
| 0.30 | 6.74 | 31% |
| 0.60 | 4.73 | 52% |
| 0.75 | 3.47 | 64% |
| 0.92 | 3.19 | 67% |
| 1.51 | 0.46 | 95% |
| 2.26 | 0.44 | 95% |
| 3.02 | 0.52 | 95% |

Example 3

300 mL of an acid solution containing less than 500 ppm of sulfuric acid at pH 2.85, with a ferrous ion concentration less than 0.55 g/L, a concentration of arsenite ion of 9.76 g/L and a copper concentration of 200 ppm, were placed in a beaker of 500 mL stirring at 300 rpm at room temperature, to which a fixed amount of sodium chlorite was added. The mixture is kept in constant agitation during 30 min and then the concentration of arsenite ion and ferrous ion in solution is measured using volumetric analysis with sulphate of cerium(IV) tartrate tetrahydrate 0.1 N from Merck.

The results of the various tests are presented in Table 2.

| Ratio $NaClO_2/$ As(III) g/g | Concentration, ppm $As^{3+}$ | Oxidation efficiency, % $As^{3+}$ |
|---|---|---|
| 0.21 | 5.97 | 26% |
| 0.43 | 4.24 | 48% |
| 0.66 | 2.64 | 67% |
| 0.89 | 0.80 | 90% |

Example 4

Six tests of PLS oxidation were made with variable concentrations of arsenic and iron, and a fixed concentration of copper equal to 35 g/L. Various sodium chlorite and hydrogen peroxide additions were made to tests in order to compare the performance of the oxidation of arsenic.

TABLE 1

Test conditions of PLS oxidation with sodium chlorite and hydrogen peroxide

| Test | Unit | P01 | P02 | P03 | P04 | P05 | P06 |
|---|---|---|---|---|---|---|---|
| Concentration of As(III) | g/L | 1.32 | 2.45 | 3.98 | 1.32 | 2.45 | 3.98 |

TABLE 1-continued

Test conditions of PLS oxidation with sodium chlorite and hydrogen peroxide

| Test | Unit | P01 | P02 | P03 | P04 | P05 | P06 |
|---|---|---|---|---|---|---|---|
| Concentration of Fe(II) | g/L | 6.68 | 5.49 | 3.93 | 6.68 | 5.49 | 3.93 |
| Concentration of Cu | g/L | 35.5 | 35.5 | 35.5 | 35.5 | 35.5 | 35.5 |
| Acidity | g/L | 45 | 45 | 45 | 45 | 45 | 45 |
| Sodium chlorite | g | 14.8 | 28.8 | 39.5 | — | — | — |
| Hydrogen Peroxide | mL | — | — | — | 21 | 65 | 107 |

Figure 3:
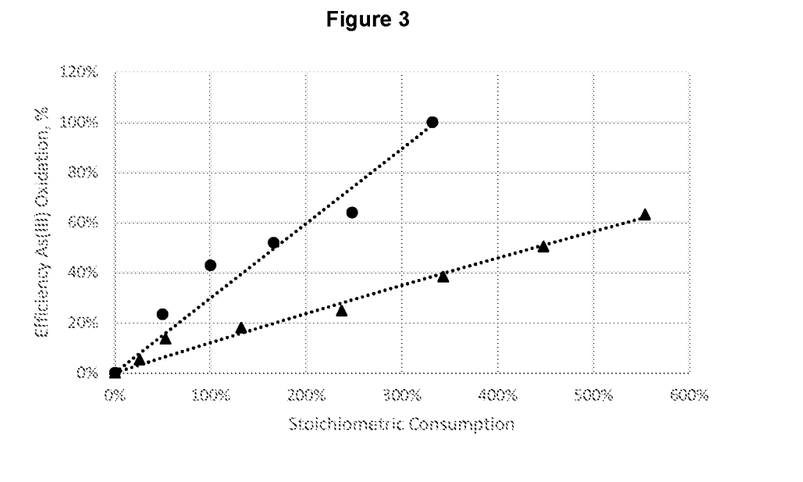
FIG. 3 shows the oxidation of PLS with an arsenite ion concentration of 1.33 g/L of sodium chlorite (circle) and hydrogen peroxide (triangle), in the tests of Example 4.
Figure 4:
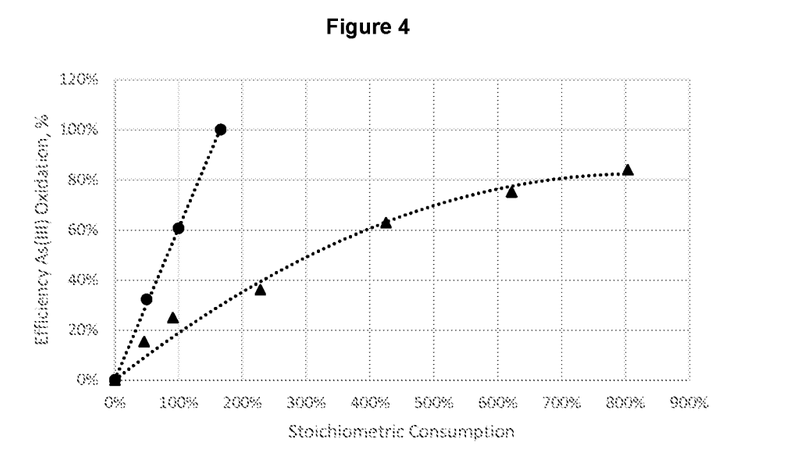
FIG. 4 shows the oxidation of PLS with an arsenite ion concentration of 2.61 g/L of sodium chlorite (circle) and hydrogen peroxide (triangle), in the tests of Example 4.
Figure 5:
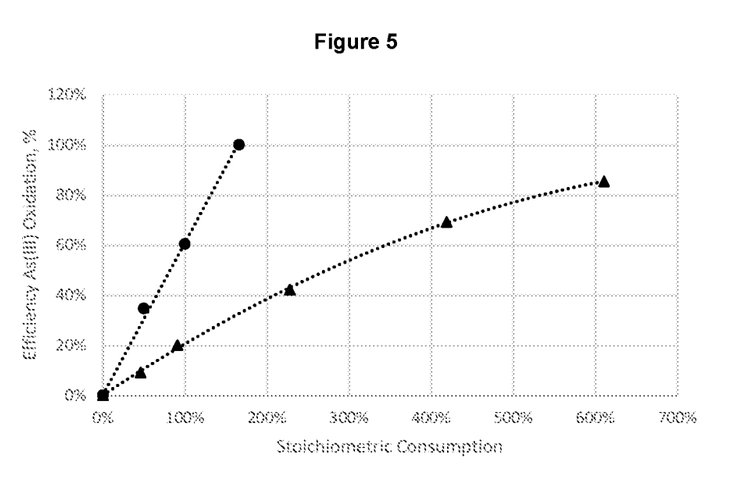
FIG. 5 shows the oxidation of PLS with an arsenite ion concentration of 3.96 g/L of sodium chlorite (circle) and hydrogen peroxide (triangle), in the tests of Example 4.

Results show that the oxidation with sodium chlorite was linear throughout the range of the oxidation, however, for hydrogen peroxide is observed an asymptotic profile in higher concentrations of arsenite ion, losing efficiency in the oxidation of arsenite ion.

Example 5

3.76 L were placed in an acid solution with a concentration of sulfuric acid of 60 g/L with an arsenic total content of 18.55 g/L, arsenite ion less than 0.02 g/L, total iron of 15.45 g/L and ferrous ion of 0.17 g/L, in such a way that the molar ratio of ferric ion and arsenate ion is equal to 1.12 mol:mol in a reactor of 5 L agitated at 400 rpm and at a temperature of 90° C. Once this temperature is reached, 1,779 mL of calcium carbonate slurry is added, prepared at a rate of 15 g of neutralizer for every 100 mL of distilled water, in order to bring the pH of the pulp to 2.2. The pulp was kept in constant agitation for a time of 5 h. After said time, pulp was left to decant during 16 h and was further filtered with a Kitasato system filter with filter paper of 80 g/m². 806 g of dry solid were obtained, with an arsenic content of 8.63%, 7.02% of iron and copper of 2.64%, while the resulting solution contained 20 g/L of copper, 110 ppm of total arsenic and 430 ppm total iron.

Example 6

3.76 L were placed in an acid solution with a concentration of sulfuric acid of 60 g/L with an arsenic total content of 18.55 g/L, arsenite ion less than 0.02 g/L, total iron of 15.45 g/L and ferrous ion of 0.17 g/L, in such a way that the molar ratio of ferric ion and arsenate ion is equal to 1.12 mol:mol in a reactor of 5 L agitated at 400 rpm and at a temperature of 90° C. Once this temperature is reached, 1,779 mL of magnesium carbonate slurry is added, prepared at a rate of 15 g of neutralizer for every 100 mL of distilled water, in order to bring the pH of the pulp to 2.2. The pulp was kept in constant agitation for a time of 5 h. After said time, pulp was left to decant during 16 h and was further filtered with a Kitasato system filter with filter paper of 2.5 μm. 274 g of dry solid were obtained with a content of 26.3% arsenic, 18.2% iron, 1.47% copper and 0.24% magnesium, while the resulting solution contained 26 g/L of copper, 60 ppm of total arsenic and 480 ppm total iron.

Example 7

3.76 L were placed in an acid solution with a concentration of sulfuric acid of 55.7 g/L with a copper content of 31.8 g/L, 19.3 g/L total arsenic, arsenite ion less than 0.02 g/L, 18.0 g/L total iron and ferrous ion of 340 ppm, in such a way that the molar ratio of ferric ion and arsenate ion is equal to 1.25 mol:mol in a reactor of 5 L agitated at 400 rpm and at a temperature of 90° C. Once this temperature was reached, 1,640 mL neutralizing slurry was added characterized because it has a 52% by weight of calcium carbonate and a 48% by weight of magnesium carbonate, where the slurry was prepared at a rate of 15 g of neutralizer for every 100 mL of distilled water, in order to bring the pH of the pulp that contains the acid solution to a pH equal to 2.2. The pulp was kept in constant agitation for a time of 5 h. After that time, the pulp was left to decant during 16 h and was filtered using a Kitasato system filter with filter paper of 2.5 μm. 475 g of dry solid were obtained with a content of 15.2% arsenic, 14.0% iron, 0.61% copper and 0.01% magnesium, while the resulting solution contained 26.6 g/L of copper, 110 ppm of total arsenic and 200 ppm total iron.

Example 8

3.76 L were placed in an acid solution with a concentration of sulfuric acid of 55.7 g/L with a copper content of 32.5 g/L, total arsenic of 20.4 g/L, arsenite ion less than 0.02 g/L, total iron of 18.9 g/L and ferrous ion of 110 ppm, in such a way that the molar ratio of ferric ion and arsenate ion is equal to 1.24 mol:mol in a reactor of 5 L agitated at 400 rpm and at a temperature of 50° C. Once this temperature was reached, 1,630 mL neutralizing slurry was added characterized because it has a 52% by weight of calcium carbonate and a 48% by weight of magnesium carbonate, where the slurry was prepared at a rate of 15 g of neutralizer for every 100 mL of distilled water, in order to bring the pH of the pulp that contains the acid solution to a pH equal to 2.2. The pulp was kept in constant agitation for a time of 5 h. After that time, the pulp was left to decant during 16 h and was filtered using a Kitasato system filter with filter paper of 2.5 μm. 471 g of dry solid were obtained with a content of 16.4% arsenic, 12.6% iron, 0.32% copper and 0.02% magnesium, while the resulting solution contained 25.8 g/L of copper, 40 ppm of total arsenic and 230 ppm total iron.

Example 9

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,115 mL of magnesium carbonate slurry was added, prepared at a rate of 15 g of neutralizer for every 100 mL of distilled water, in order to bring the pH of the pulp to a pH equal to 1.2. The pulp was kept in constant agitation for a time of 5 h. After that time, the pulp was left to decant during 16 h and was filtered using a Kitasato system filter with filter paper of 2.5 μm. 220 g of dry solid were obtained with a content of 27.3% arsenic, 21.5% iron, 0.56% copper and 0.02% magnesium, while the resulting solution contained 24.2 g/L of copper, 1,230 ppm of total arsenic and 1,460 ppm total iron.

Example 10

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,295 mL of magnesium carbonate slurry was added, prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 266 g of dry solid were obtained with a content of 25.7% arsenic, 20.7% iron, 0.68% copper and 0.12% magnesium, while the resulting solution contained 22.5 g/L of copper, 300 ppm of total arsenic and 920 ppm total iron.

Example 11

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,245 mL of slurry was added, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp to a pH equal to 1.2. The pulp was kept in constant agitation for a time of 5 h. After that time, the pulp was left to decant during 16 h and was filtered using a Kitasato system filter with filter paper of 2.5 µm. 393 g of solid dry were obtained with a content of 16.8% arsenic, 12.9% iron, 0.26% copper, 13.4% calcium and 0.01% magnesium, while the resulting solution contained 25.4 g/L of copper, 1,010 ppm of total arsenic and 3,100 ppm total iron.

Example 12

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,460 mL of slurry were added, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 456 g of solid dry were obtained with a content of 15.6% arsenic, 13.1% iron, 0.36% copper, 14.9% calcium and 0.01% magnesium, while the resulting solution contained 24.5 g/L of copper, 160 ppm of total arsenic and 870 ppm total iron.

Example 13

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,385 mL of calcium carbonate slurry was added, prepared at a rate of 15 g of neutralizer for every 100 mL of distilled water, in order to bring the pH of the pulp to a pH equal to 1.2. The pulp was kept in constant agitation for a time of 5 h. After that time, the pulp was left to decant during 16 h and was filtered using a Kitasato system filter with filter paper of 2.5 µm. 640 g of solid dry were obtained with a content of 10.0% arsenic, 8.9% iron, 0.23% copper, 17.8% calcium and 0.02% magnesium, while the resulting solution contained 27.9 g/L of copper, 1,380 ppm of total arsenic and 1,640 ppm total iron.

Example 14

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 90° C. Once this temperature was reached, 1,699 mL of calcium carbonate slurry was added, prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 810 g of solid dry were obtained with a content of 8.5% arsenic, 7.8% iron, 0.28% copper, 17.6% calcium and 0.02% magnesium, while the resulting solution contained 25.6 g/L of copper, 190 ppm of total arsenic and 990 ppm total iron.

Example 15

3.5 L were placed in an acid solution with a concentration of sulfuric acid of 49.5 g/L with a copper content of 32.9 g/L, total arsenic of 20.0 g/L, arsenite ion less than 0.02 g/L, total iron of 10.04 g/L and ferrous ion of 0.17 g/L in an agitated reactor of 5 L, to which 256 mL of a solution of magnetite leaching was added with 34.1 g/l sulfuric acid, 111.5 g/L iron and 2.65 g/L of ferrous ion, in such a way that the molar ratio of ferric ion and arsenate ion is equal to 1.22 mol:mol. The reactor was agitated at 400 rpm and at a temperature of 50° C. Once this temperature was reached, 1,295 mL of magnesium carbonate slurry was added, prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 175 g of dry solid were obtained with a content of 33.1% arsenic, 28.7% iron, 0.72% copper and 0.13% magnesium, while the resulting solution contained 25.9 g/L of copper, 1,120 ppm of total arsenic and 1,430 ppm total iron.

Example 16

3.5 L were placed in a acid solution with a concentration sulfuric acid of 45.2 g/L with a copper content of 32.1 g/L, total of 20.0 g/l arsenic, arsenite ion less than 0.04 g/L, total iron of 18.2 g/L and ferrous ion of 0.08 g/L in an agitated reactor of 5 L, to which were added 143 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.20 mol:mol. The reactor was agitated at 400 rpm and at a temperature of 50° C. Once this temperature was reached, 1,210 mL of slurry were added, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 332 g of solid dry were obtained with a content of 18.0% arsenic, 15.3% iron, 0.17% copper, 9.9% calcium and 0.02% magnesium, while the resulting solution contained 26.1 g/L of copper, 850 ppm of total arsenic and 1,300 ppm total iron.

Example 17

3.5 L were placed in a acid solution with a concentration sulfuric acid of 49.5 g/L with a copper content of 32.9 g/L, total of 20.0 g/l arsenic, arsenite ion less than 0.02 g/L, total iron of 10.04 g/L and ferrous ion of 0.17 g/L in an agitated reactor of 5 L, to which were added 143 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.20 mol:mol. The reactor was agitated at 400 rpm and at a temperature of 50° C. Once this temperature was reached, 1,295 mL of calcium carbonate slurry was added, prepared at a rate of 15 g of neutralizer for every 100 mL of distilled water, in order to bring the pH of the pulp to a pH equal to 1.5. The pulp was kept in constant agitation for a time of 5 h. After that time, the pulp was left to decant during 16 h and was filtered using a Kitasato system filter with filter paper of 2.5 µm. 454 g of dry solid were obtained with a content of 13.0% arsenic, 11.6% iron, 0.31% copper, 10.7% of calcium from 0.02% magnesium, while the resulting solution contained 25.6 g/L of copper, 990 ppm of total arsenic and 1,000 ppm total iron.

Example 18

3.5 L of an a acid solution with a concentration sulfuric acid of 54.5 g/L with a copper content of 59.0 g/L, total of 12.2 g/L, arsenite ion less than 0.37 g/L, total iron of 13.4 g/L and ferrous ion less than 0.56 g/L were placed in an agitated reactor of 5 L1, to which were added 37 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.63 mol:mol. The reactor was agitated at 400 rpm and at a temperature of 90° C. Once this temperature was reached, 580 mL of calcium carbonate slurry were added, prepared at a rate of 15 g of neutralizer for every 100 mL of distilled water, in order to bring the pH of the pulp to a free acidity of 30 g/L. The pulp was kept in constant agitation for a time of 5 h. After that time, the pulp was left to decant during 16 h and was filtered using a Kitasato system filter with filter paper of 2.5 µm. 229 g of solid dry were obtained with a content of 16.8% arsenic, 12.5% iron, 0.78% copper, 12.1% calcium and 0.01% magnesium, while the resulting solution contained 49.5 g/L of copper, 1,060 ppm of total arsenic and 5,560 ppm total iron.

Example 19

3.5 L of an a acid solution with a concentration sulfuric acid of 54.5 g/L with a copper content of 59.0 g/L, total of 12.2 g/L, arsenite ion less than 0.37 g/L, total iron of 13.4 g/L and ferrous ion less than 0.56 g/L were placed in an agitated reactor of 5 L1, to which were added 37 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.63 mol:mol. The reactor was agitated at 400 rpm and at a temperature of 90° C. Once this temperature was reached, 530 mL of calcium carbonate slurry were added, prepared at a rate of 15 g of neutralizer for every 100 mL of distilled water, in order to bring the pH of the pulp to a free acidity of 30 g/L. The pulp was kept in constant agitation for a time of 44 h. After that time, the pulp was left to decant during 16 h and was filtered using a Kitasato system filter with filter paper of 2.5 µm. 218 g of solid dry were obtained with a content of 19.5% arsenic, 14.5% iron, 0.74% copper, 8.9% calcium and 0.01% magnesium, while the resulting solution contained 52.2 g/L of copper, 130 ppm of total arsenic and 5,140 ppm total iron.

Example 20

3.5 L of an a acid solution with a concentration sulfuric acid of 54.5 g/L with a copper content of 59.0 g/L, total of 12.2 g/L, arsenite ion less than 0.37 g/L, total iron of 13.4 g/L and ferrous ion less than 0.56 g/L were placed in an agitated reactor of 5 L1, to which were added 40 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.62 mol:mol. The reactor was agitated at 400 rpm and at a temperature of 90° C. Once this temperature was reached, 530 mL of magnesium carbonate slurry were added, prepared at a rate of 15 g of neutralizer for every 100 mL of distilled water, in order to bring the pH of the pulp to a free acidity of 30 g/L. The pulp was kept in constant agitation for a time of 48 h. After that time, the pulp was left to decant during 16 h and was filtered using a Kitasato system filter with filter paper of 2.5 µm. 218 g of solid dry were obtained with a content of 29.4% arsenic, 26.0% iron, 0.84% copper, 0.07% calcium and 0.01% magnesium, while the resulting solution contained 57.4 g/L of copper, 150 ppm of total arsenic and 5,280 ppm total iron.

Example 21

3.5 L of an a acid solution with a concentration sulfuric acid of 54.5 g/L with a copper content of 59.0 g/L, total of 12.2 g/L, arsenite ion less than 0.37 g/L, total iron of 13.4 g/L and ferrous ion less than 0.56 g/L were placed in an agitated reactor of 5 L1, to which were added 40 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.62 mol:mol. The reactor was agitated at 400 rpm and at a temperature of 90° C. Once this temperature was reached, 530 mL of magnesium carbonate slurry were added, prepared at a rate of 15 g of neutralizer for every 100 mL of distilled water, in order to bring the pH of the pulp to a free acidity of 30 g/L. The pulp was kept in constant agitation for a time of 48 h. After that time, the pulp was left to decant during 16 h and was filtered using a Kitasato system filter with filter paper of 2.5 μm. 218 g of solid dry were obtained with a content of 23.0% arsenic, 18.9% iron, 0.67% copper, 4.9% calcium and 0.02% magnesium, while the resulting solution contained 53.4 g/L of copper, 160 ppm of total arsenic and 4,860 ppm total iron.

Example 22

3.5 L of an a acid solution with a concentration sulfuric acid of 54.5 g/L with a copper content of 59.0 g/L, total of 12.2 g/L, arsenite ion less than 0.37 g/L, total iron of 13.4 g/L and ferrous ion less than 0.56 g/L were placed in an agitated reactor of 5 L1, to which were added 40 mL of a leaching solution of magnetite of 59.6 g/l sulfuric acid, 145.6 g/L total iron and 0.11 g/L of ferrous ion, in such a way that the molar ratio of ferric ion and arsenate ion is equal to 1.62 mol:mol. The reactor was agitated at 400 rpm and at a temperature of 90° C. Once this temperature was reached, 530 mL of slurry were added, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp to a free acidity of 30 g/L. The pulp was kept in constant agitation for a time of 48 h. After that time, the pulp was left to decant during 16 h and was filtered using a Kitasato system filter with filter paper of 2.5 μm. 218 g of solid dry were obtained with a content of 23.0% arsenic, 18.9% iron, 0.67% copper, 4.9% calcium and 0.02% magnesium, while the resulting solution contained 53.4 g/L of copper, 160 ppm of total arsenic and 4,860 ppm total iron.

Example 23

3.5 L of an acid solution with a concentration sulfuric acid of 41.1 g/L with a copper content of 50.9 g/L, total of 12.1 g/L, arsenite ion less than 0.37 g/L, total iron of 13.4 g/L and ferrous ion of 5.7 g/L were placed in an agitated reactor of 5 L, previously oxidized with a solution of 63 g/L of sodium chlorite stabilized in sodium hydroxide at pH 12. To that solution, 42 mL of a leaching solution were added of magnetite of 59.6 g/l sulfuric acid, 145.6 g/L total iron and 0.11 g/L of ferrous ion, in such a way that the molar ratio of ferric ion and arsenate ion is equal to 1.1 mol:mol. The reactor was agitated at 400 rpm and at a temperature of 90° C. Once this temperature was reached, 286 mL of calcium carbonate slurry were added, prepared at a rate of 15 g of neutralizer for every 100 mL of distilled water, in order to bring the pH of the pulp to a free acidity of 30 g/L. The pulp was kept in constant agitation for a time of 48 h. After that time, the pulp was left to decant during 16 h and was filtered using a Kitasato system filter with filter paper of 2.5 μm. 162 g of solid dry were obtained with a content of 24.9% arsenic, 17.1% iron, 1.34% copper, 5.9% calcium and 0.03% magnesium, while the resulting solution contained 57.2 g/L of copper, 480 ppm of total arsenic and 7,000 ppm total iron.

Example 24

3.5 L of an acid solution with a concentration sulfuric acid of 41.1 g/L with a copper content of 50.9 g/L, total of 12.1 g/L, arsenite ion less than 0.37 g/L, total iron of 13.4 g/L and ferrous ion of 5.7 g/L were placed in an agitated reactor of 5 L, previously oxidized with a solution of 63 g/L of sodium chlorite stabilized in sodium hydroxide at pH 12. To that solution, 42 mL of a leaching solution were added of magnetite of 59.6 g/l sulfuric acid, 145.6 g/L total iron and 0.11 g/L of ferrous ion, in such a way that the molar ratio of ferric ion and arsenate ion is equal to 1.1 mol:mol. The reactor was agitated at 400 rpm and at a temperature of 90° C. Once this temperature was reached, 253 mL of slurry were added, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp to a free acidity of 30 g/L. The pulp was kept in constant agitation for a time of 48 h. After that time, the pulp was left to decant during 16 h and was filtered using a Kitasato system filter with filter paper of 2.5 μm. 147 g of solid dry were obtained with a content of 27.5% arsenic, 18.3% iron, 2.21% copper, 4.5% calcium and 0.03% magnesium, while the resulting solution contained 58.6 g/L of copper, 520 ppm of total arsenic and 7,300 ppm total iron.

Example 25

A continuous oxidation and precipitation test was performed for scorodite for a period of 10 days, to an acidic solution containing 8.0 g/L of total arsenic, 1.4 g/L of arsenite ion and 10.0 g/L total iron. The acid solution was oxidized with 2.1 g of sodium chlorite per 1 g of arsenate ion, reaching a arsenate ion concentration below 370 ppm. The acid solution had a molar ratio of ferric ion to arsenate ion of 1.69 mol:mol, so there was no need to adjust with a leaching solution of magnetite. The system was disposed with two reactors of 20 L agitated at 700 rpm L connected in series, with a residence time of 24 h per reactor. A slurry was supplied, characterized because it has a 52% by weight of calcium carbonate and a 48% by weight of magnesium carbonate, where the slurry was prepared at a rate of 15 g of neutralizer for every 100 mL of distilled water, in order to bring the pH of the pulp in the first reactor to a free acidity of 35 g/L and 35 g/L in the second reactor. The system was connected to a online system of decantation and filtration, from where 30 percent of the thickened pulp was recirculated to the reactor 1, to serve as a surface for the generation of crystals of scorodite. The system is operated during a course of 10 days resulting in an acid solution that on average had a concentration of 600 g/L of total arsenic and a solid that had an average content of 24% As.

Example 26

There were four neutralization tests of PLS with a volume of 4,120 mL and a arsenic concentration of 12.5 g/L and sulfuric acid of 45 g/L. A slurry was added to the 25% p/p of calcium hydroxide, reaching pH 0.7, 0.9, 1.1 and 1.3, respectively.

| Test | Unit | P01 | P02 | P03 | P04 |
|---|---|---|---|---|---|
| Concentration of As | g/L | 12.5 | 12.5 | 12.5 | 12.5 |
| Sulfuric acid concentration | | — | — | — | — |
| Before the neutralization | g/L | 45 | 45 | 45 | 45 |
| After neutralization | g/L | 31.9 | 17.8 | 11.1 | 6.84 |
| Arsenic Removal | % | 0.06 | 2.81 | 24.8 | 26.3 |
| Gypsum generated | g | 70 | 149 | 213 | 233 |

The test P01 obtained the lower arsenic removal, with only a 0.06 percent of arsenic present in the head, generating 70 g of gypsum with a minimum of arsenic.

Example 27

A test was conducted with 3,000 mL of 8.8 g/L of arsenic (3.0 g/L As(III)) solution, oxidizing with 4.8 mL of hydrogen peroxide 50% p/p, followed by 13.6 g of sodium chlorite, equivalent to oxidize 25% of As(III) with hydrogen peroxide and 75% of the As(III) with sodium chlorite. Subsequently, the solution was adjusted with a magnetite leaching solution to adjust the Fe(III)/As(V) to 1.2, heated to 90° C. and adding artificial dolomitic limestone slurry with 47% of magnesium carbonate and 53% calcium carbonate, to bring the solution to an acidity of 30 g/L. It was kept under agitation at 400 rpm for 48 h, and subsequently the solid was filtered and washed with distilled water.

Example 28

A test was conducted with 3,000 mL of 8.8 g/L of arsenic (3.0 g/L As(III)) solution, oxidizing with 20 g of sodium chlorite. Subsequently, the solution was adjusted with a magnetite leaching solution to adjust the Fe(III)/As(V) to 1.2, heated to 90° C. and adding artificial dolomitic limestone slurry with 47% of magnesium carbonate and 53% calcium carbonate, to bring the solution to an acidity of 30 g/L. It was kept under agitation at 400 rpm for 48 h, and subsequently the solid was filtered and washed with distilled water.

Example 29

A test was conducted with 3,000 mL of 8.8 g/L of arsenic (3.0 g/L As(III)) solution, oxidizing with 260 mL of sodium hypochlorite at a concentration of 100 g/L. Subsequently, the solution was adjusted with a magnetite leaching solution to adjust the Fe(III)/As(V) to 1.2, heated to 90° C. and adding artificial dolomitic limestone slurry with 47% of magnesium carbonate and 53% calcium carbonate, to bring the solution to an acidity of 30 g/L. It was kept under agitation at 400 rpm for 48 h, and subsequently the solid was filtered and washed with distilled water.

Example 30

A test was conducted with 3,000 mL of the neutralization solution of example 26, Test P01 (0.9 g/L As(III)). The solution was oxidized with 6.8 g of sodium chlorite. Subsequently, the solution was adjusted with a magnetite leaching solution to adjust the Fe(III)/As(V) to 1.2, heated to 90° C. and adding artificial dolomitic limestone slurry with 47% of magnesium carbonate and 53% calcium carbonate, to bring the solution to an acidity of 30 g/L. It was kept under agitation at 400 rpm for 48 h, and subsequently the solid was filtered and washed with distilled water.

Example 31

A test was conducted with 2,000 mL of a magnetite leaching solution containing 90 g/L of sulfuric acid and 42.9 g/l Fe(II) at room temperature. Sodium chlorite was added at different doses in order to oxidize the ferrous ion to ferric ion. Samples were taken 30 min after each addition of sodium chlorite. The results showed a linear behavior of the oxidation of Fe(II), with a very similar performance to the theoretical consumption.

TABLE 2

Efficiency of oxidation of ferrous ion in magnetite leaching solution using sodium chlorite

| $NaClO_2$ accumulated g | Fe(II) g/L | Oxidation Efficiency % | Theoretical oxidation efficiency % |
|---|---|---|---|
| 0.0 | 12.42 | 0.0% | 0.0% |
| 2.3 | 11.18 | 10.0% | 11.4% |
| 4.6 | 9.9 | 20.3% | 23.0% |
| 6.8 | 8.47 | 32.0% | 34.7% |
| 9.0 | 7.42 | 40.5% | 46.6% |
| 11.2 | 5.67 | 54.7% | 58.5% |
| 13.2 | 3.64 | 71.1% | 70.4% |
| 15.2 | 2.35 | 81.4% | 82.3% |
| 17.0 | 1.19 | 90.7% | 94.2% |
| 18.7 | 0.15 | 98.8% | 106.0% |

Example 32

A test was conducted with 2,000 mL of a leaching of foundry powders containing 46 g/L of sulfuric acid, 12.8 g/l Fe(II) and 0.95 g/L As(III) at room temperature. Sodium chlorite was added at different doses in order to oxidize the ferrous ion to ferric ion and arsenite ion ion to arsenate. Samples were taken 30 min after each addition of sodium chlorite. The results showed a linear behavior of the oxidation of Fe(II) and As(III), with a very similar performance to the theoretical consumption.

TABLE 3

Efficiency of oxidation of arsenoso ion in leaching solution of foundry powders using sodium chlorite

| $NaClO_2$ accumulated g | As(III) g/L | Oxidation Efficiency % | Theoretical oxidation efficiency % |
|---|---|---|---|
| 0.0 | 0.95 | 0.0% | 0.0% |
| 2.3 | 0.7 | 26.3% | 100.3% |
| 4.6 | 0.53 | 44.3% | 201.1% |
| 6.8 | 0.26 | 72.8% | 300.2% |
| 9.0 | 0.08 | 91.7% | 395.5% |
| 11.2 | 0.04 | 95.9% | 485.0% |
| 13.2 | 0 | 100.0% | 567.5% |
| 15.2 | 0 | 100.0% | 641.7% |
| 17.0 | 0.03 | 97.0% | 707.1% |
|  | 0 | 100.0% | 763.4% |

TABLE 4

Efficiency of oxidation of ferrous ion in leaching solution of foundry powders using sodium chlorite

| NaClO$_2$ accumulated g | Fe(II) g/L | Oxidation Efficiency % | Theoretical oxidation efficiency % |
|---|---|---|---|
| 0.0 | 12.42 | 0.0% | 0.0% |
| 2.3 | 11.18 | 10.0% | 11.4% |
| 4.6 | 9.9 | 20.3% | 23.0% |
| 6.8 | 8.47 | 32.0% | 34.7% |
| 9.0 | 7.42 | 40.5% | 46.6% |
| 11.2 | 5.67 | 54.7% | 58.5% |
| 13.2 | 3.64 | 71.1% | 70.4% |
| 15.2 | 2.35 | 81.4% | 82.3% |
| 17.0 | 1.19 | 90.7% | 94.2% |
|  | 0.15 | 98.8% | 106.0% |

Example 33

3,500 mL of a PLS solution were taken with 12.5 g/L, 20 g/l Fe, 35.9 g/L Cu and 46.6 g/L of sulfuric acid. Lime slurry was added at 25% p/v to neutralize the pulp up to 33 g/L at room temperature. We obtained a gypsum that had efficiency of arsenic removal copper, and iron of less than 0.1%.

Example 34

3,500 mL of a PLS solution were taken, with 12.5 g/L (0.9 g/L As(III)), 20 g/l Fe, 35.9 g/L Cu and 46.6 g/L of sulfuric acid. Lime slurry was added at 25% p/v to neutralize the pulp up to 36 g/L at room temperature. We obtained a gypsum that had efficiency of arsenic removal copper, and iron of less than 0.05%.

Example 35

The previously neutralized PLS solution of the exercise 33, was subjected to a precipitation process of scorodite, oxidizing the As(III) and Fe(II) present with sodium chlorite adding 6.8 g NaClO$_2$ 80%, raising the temperature to 90° C., neutralizing with a slurry of dolomitic limestone to 15% p/v to reach 30 g/L and maintaining such acidity, and in constant agitation for 48 h. The results showed a precipitation efficiency of 99.3% As and only a 0.9% of Cu. The residue was scorodite with gypsum precipitate, with a content of 28% As. The chloride concentration was 0.7 g/L.

Example 36

A PLS solution with 46.6 g/L of sulfuric acid, 7.4 g/L (3.0 g/L As(III)), 13.5 g/L Cu and 14 g/l Fe was subjected to a process of precipitation of gypsum to bring the mixture to 33 g/L of sulfuric acid as in the example 33. Then scorodite was precipitated, oxidizing the As(III) and Fe(II) present with sodium hypochlorite, adding 130 mL NaClO 100 g/L, raising the temperature to 90° C., neutralizing with a slurry of dolomitic limestone to 15% p/v to reach 30 g/L and maintaining such acidity, and in constant agitation for 48 h. The results showed an efficiency of precipitation of 97% As and only a 1.2% of Cu. The residue was scorodite with gypsum precipitate, with a content of 24% As. The chloride concentration was 4 g/L.

Example 37

A PLS solution with 46.6 g/L of sulfuric acid, 7.4 g/L (3.0 g/L As(III)), 13.5 g/L Cu and 14 g/l Fe was subjected to a process of precipitation of gypsum to bring the mixture to 33 g/L of sulfuric acid as in the example 33. Then scorodite was precipitated, oxidizing the As(III) and Fe(II) with 12 g of sodium chlorite, and then raising the temperature to 90° C., neutralizing with a slurry of dolomitic limestone to 15% p/v to reach 30 g/L and maintaining such acidity, and in constant agitation for 48 h. The results showed an efficiency of precipitation of 98% As and only a 1.2% of Cu. The residue was scorodite with gypsum precipitate, with a content of 25% As. The chloride concentration was 1.6 g/L.

Example 38

A PLS solution with 46.6 g/L of sulfuric acid, 7.4 g/L (3.0 g/L As(III)), 13.5 g/L Cu and 14 g/l Fe was subjected to a process of precipitation of gypsum to bring the mixture to 33 g/L of sulfuric acid as in the example 33. Then scorodite was precipitated, oxidizing the As(III) and Fe(II) present adding in a first stage hydrogen peroxide to 50% v/v and in a second stage with sodium chlorite. Hydrogen peroxide was added at a rate of 0.44 mol of hydrogen peroxide per mol of As(III), and then 0.4 mol of sodium chlorite per mol of initial As(III) in the solution, in order to oxidize 40% of As(III) with hydrogen peroxide and the rest with sodium chlorite. After the oxidation, temperature was increased to 90° C., neutralizing with a slurry of dolomitic limestone to 15% p/v to reach 30 g/L and maintaining such acidity, and in constant agitation for 48 h. The results showed an efficiency of precipitation of 97% Ass and only a 1.2% of Cu.

The residue was scorodite with gypsum precipitate, with a content of 25% As. The chloride concentration was 1.0 g/L.

Figure 1:
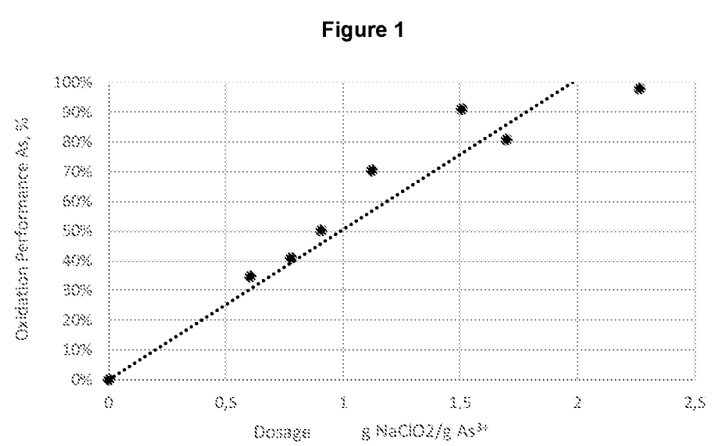
FIG. 1 shows the performance of the oxidation of arsenite ion in percentage based on the addition of sodium chlorite per mass unit of arsenite ion in g/g.
Figure 2:
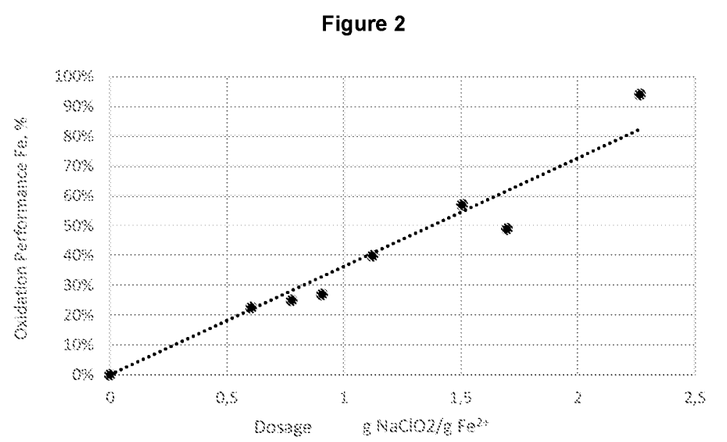
FIG. 2 shows the performance of the oxidation of ferrous ion in percentage based on the addition of sodium chlorite per mass unit of ferrous ion in g/g.

The figures show the oxidizing potential of sodium chlorite on hydrogen peroxide when working with leaching solutions of foundry powders. The Figures I and II show the efficiency of oxidation of As(III) as well as that of the Fe(II) having a linear behavior with regard to the provided dose of sodium chlorite.

Example 39

An analysis of scanning electron microscopy was performed to arsenical precipitates obtained in example 35. The proportions of As, Fe and O generate crystals with the proportion of chemical speciation of the scorodite FeAsO$_4$, as well as the presence of gypsum in the precipitates.

TABLE 4

Spectrum of scanning electron microscopy of arsenical precipitates

| Spectrum | O | S | Ca | Fe | Cu | As |
|---|---|---|---|---|---|---|
| 1 | 41.74 | 2.07 | 0.34 | 22.14 | 1.72 | 32 |
| 2 | 45.9 | 2.14 | 0.54 | 20.23 | 1.64 | 29.55 |
| 3 | 26.07 | 27.09 | 42.74 | 1.08 | — | 3.02 |
| 4 | 36.25 | 1.97 | 0.25 | 24.76 | 1.88 | 34.89 |

Example 40

Chemical stability tests were conducted for the precipitate obtained under the procedure described in Example 35. The results show a very low release of As, which gives an account of the stability of the generated residue.

TABLE 5

Concentration of As released in stability analysis of solid wastes generated in neutralization tests with dolomitic limestone

| Test | Batch test precipitate |
|------|------------------------|
| TCLP | 0.46 ppm |
| SPLP | 0.29 ppm |
| IMP  | 0.15 ppm |

Example 41

Figure 10:
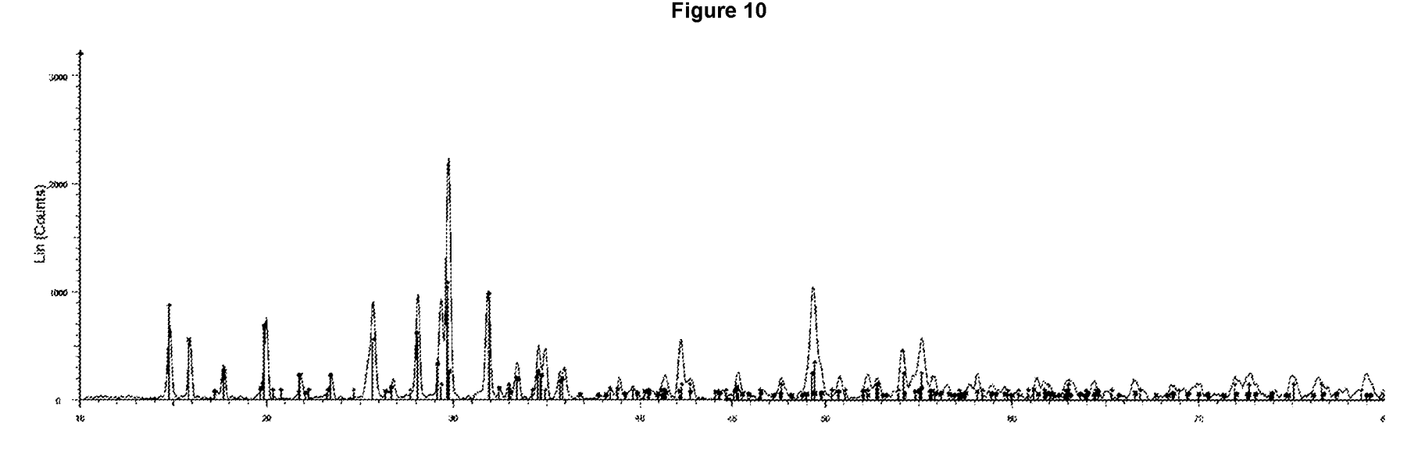
FIG. 10 shows the spectrum of x-ray diffraction of the arsenic precipitate.
Figure 11:
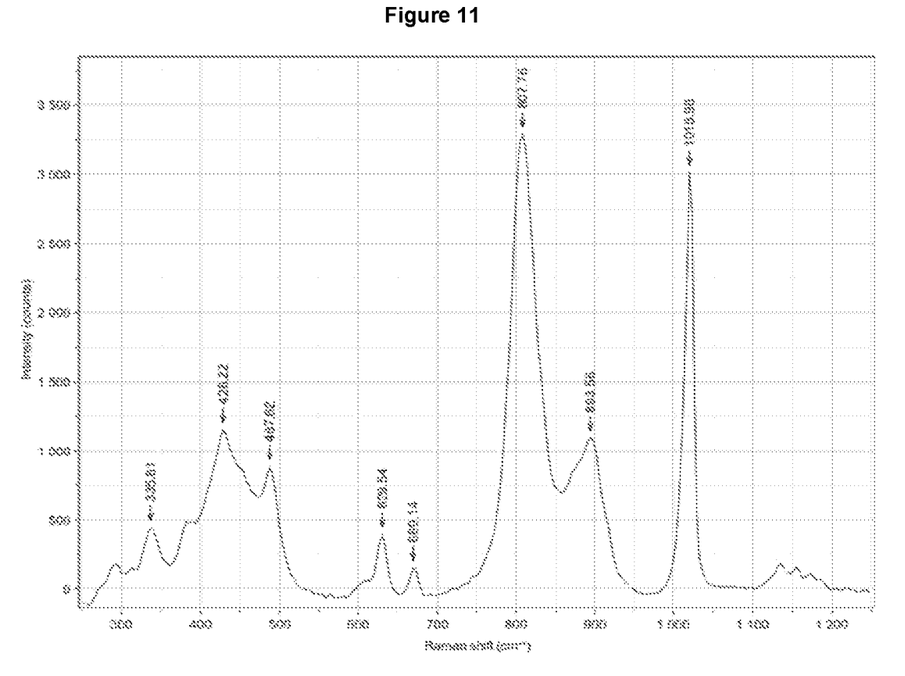
FIG. 11 shows the Raman spectrum of the arsenic precipitate.

Analysis of x-ray diffraction (FIG. 10) and Raman spectrometry (FIG. 11) were performed. Both analyzes confirmed the presence of scorodite and gypsum in the arsenic precipitates of the Example 35. For the Raman spectrum peaks in 428, 487, 629, 669 and 1018 cm correspond to bassanita mineral ($CaSO_4 \cdot 0.5H_2O$), while the peaks in 335, 807 and 893 cm correspond to the mineral scorodite ($FeAsO_4 \cdot 2H_2O$).

The stoichiometric consumption of As(III) is calculated as follows

Sodium Chlorite $$HAsO_2 + H_2O + 1/2\ NaClO_2 \rightarrow$$

$$H_3AsO_4 + NaCl \quad \text{Stoichiometric consumption} = 200 \frac{\text{moles } NaClO_2}{\text{moles As}(III)_{start}} \%$$

Hydrogen Peroxide $$HAsO_2 + H_2O_2 \rightarrow H_3AsO_4 \quad \text{Stoichiometric consumption} =$$

$$100 \cdot \frac{\text{moles } H_2O_2}{\text{moles As}(III)_{start}} \%$$

The stoichiometric consumption of Fe(II) is calculated as follows

Sodium Chlorite $$FeSO_4 + 1/2\ H_2SO_4 + 1/4\ NaClO_2 \rightarrow$$

$$1/2\ Fe_2(SO_4)_3 + 1/2\ NaCl + 1/2\ H_2O \quad \text{Stoichiometric consumption} =$$

$$25 \frac{\text{moles } NaClO_2}{\text{moles Fe}(II)_{start}} \%$$

Hydrogen Peroxide $$FeSO_4 + 1/2\ H_2SO_4 + 1/2\ H_2O_2 \rightarrow$$

$$1/2\ Fe_2(SO_4)_3 + H_2O \quad \text{Stoichiometric consumption} =$$

$$50 \cdot \frac{\text{moles } H_2O_2}{\text{moles Fe}(II)_{start}} \%$$

FIG. 3 shows that for concentrations of As in the order of 1.33 g/L, the stoichiometric consumption in the oxidation reaction of As(III) is more efficient for the sodium chlorite than that for hydrogen peroxide. As the concentration of As(III) increases to 2.61 g/L (FIG. 4) and 3.96 g/L (FIG. 5), the stoichiometric consumption of sodium chlorite becomes more efficient in respect to the consumption of hydrogen peroxide. It is important to note that the stoichiometric consumption of Figures I, II, III, IV and V are calculated with respect to the oxidation of As(III), however, in the experiments there was also the presence of Fe(II) which also consumes oxidizer to produce Fe(III), which makes the plotted consumption of stoichiometric As(III) greater than 100%.

Figure 6:
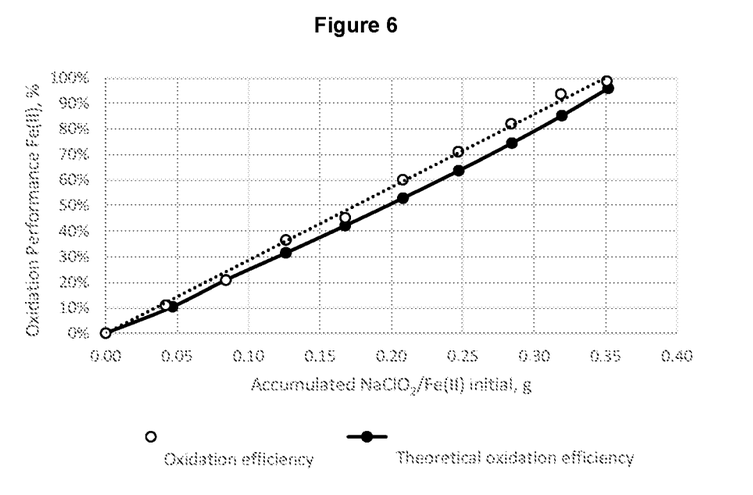
FIG. 6 shows the oxidation of leach solution of Magnetite with a ferrous ion concentration of 42.9 g/L with sodium chlorite, on the evidence of the Example 31. Experimental data (empty circle), theoretical calculation (filled circle).
Figure 7:
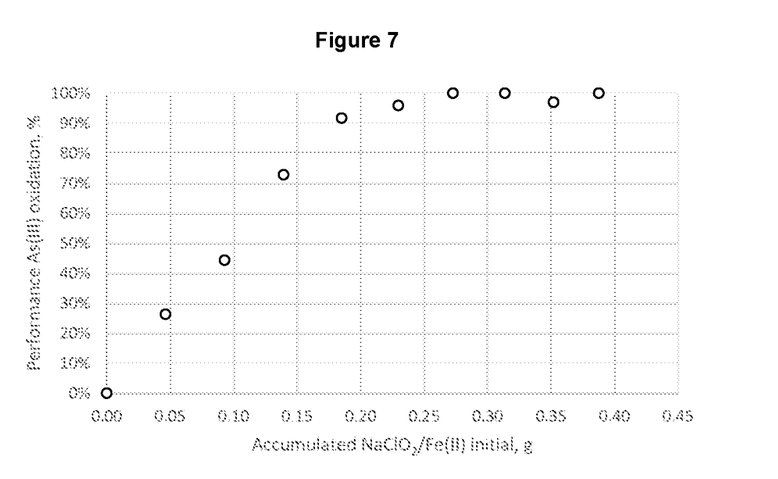
FIG. 7 shows the oxidation of arsenite ion in solution of leaching of Magnetite with a ferrous ion concentration of 12.4 g/L and arsenite ion of 0.95 g/L with sodium chlorite, on the evidence of the Example 32.
Figure 8:
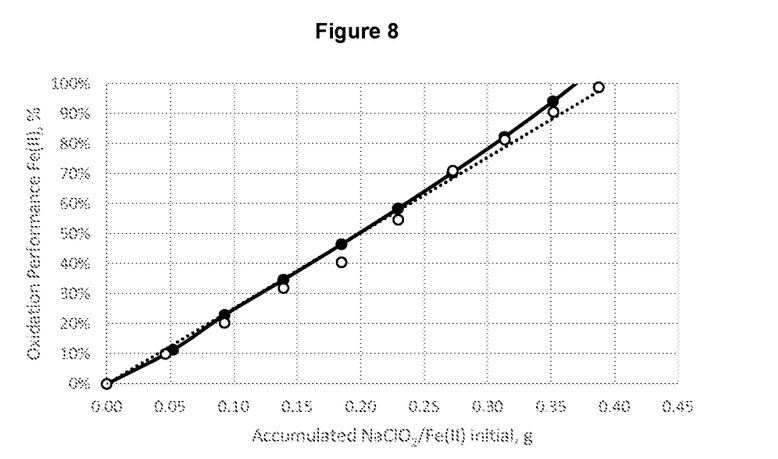
FIG. 8 shows the oxidation of ferrous ion in solution of leaching of Magnetite with a ferrous ion concentration of 12.4 g/L and arsenite ion of 0.95 g/L with sodium chlorite, on the evidence of the Example 32. Experimental data (empty circle), theoretical calculation (filled circle).
Figure 9:
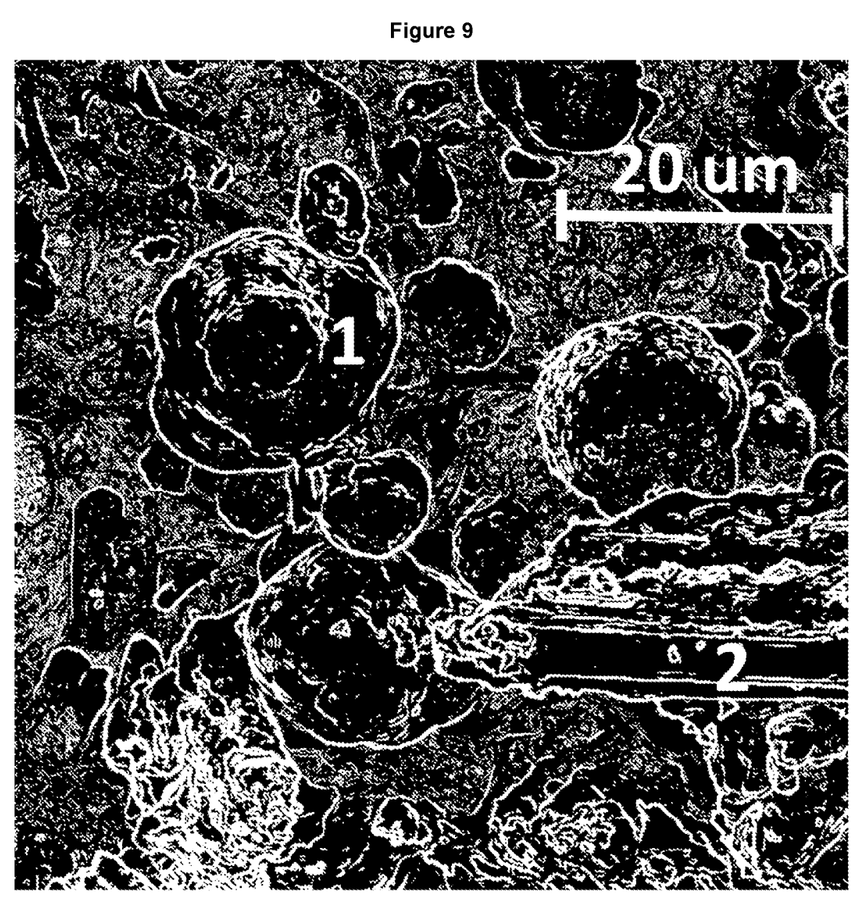
FIG. 9 shows the SEM morphology of the arsenic precipitate obtained by the method of the invention. Number 1 shows crystals of scorodite, number 2 shows gypsum crystals.

In the case of the Figures VI and VIII it is noted that the performance of oxidation of ferrous ion in the presence of low concentrations of arsenite ion is highly efficient, and approaching 100% stoichiometric performance with sodium chlorite.

The precipitation with dolomitic limestone is beneficial, in that the magnesium in this type of carbonates neutralize acid without generating gypsum, which allows to increase the content of arsenic in the precipitate, compared with the precipitation of calcium carbonate or limestone.

The oxidation with sodium chlorite is more beneficial than using sodium hypochlorite, since more moles of sodium hypochlorite are needed in order to oxidize As(III) and Fe(II), increasing the concentration of chloride in the final solution rich in copper. The greater presence of chloride can be harmful to the downstream process. That is why the combinations of oxidizing agents such as hydrogen peroxide and sodium chlorite allow to reduce the content of chloride in the solution rich in copper, but even so, maximizes the oxidation of arsenite ion. The oxidation with hydrogen peroxide should be performed at an initial stage, where the oxidative behavior shows a linear behavior, while the sodium chlorite can be used as a second oxidizer allowing to complete the oxidation.

The analysis of physical characterization such as XRD, Raman and scanning electron microscopy confirmed that in the arsenic precipitates there is presence of scorodite.

The invention claimed is:

1. A procedure for obtaining a mining or industrial waste, comprising ferric arsenate and/or scorodite with a high arsenic content from highly acidic solutions, superior in concentration of acid to 45 g/L, which include copper, arsenic and optionally iron, antimony and/or bismuth, the procedure comprising:
    i. contacting a first highly acidic solution rich in arsenic, and optionally containing iron, with a first slurry of neutralizer so that the acid concentration of the resulting solution is 35-45 g/L, obtaining a second acidic solution rich in arsenic with acid reduced solution, and optionally containing iron, and a first solid that includes gypsum with low arsenic content;
    ii. contacting said second acidic solution rich in arsenic with a first oxidant that simultaneously oxidizes arsenite ion to arsenate ion and oxidizes the ferrous ion to ferric ion to obtain a third acidic solution rich in arsenic;
    iii. contacting the third acidic solution rich in arsenic with a second oxidant that simultaneously oxidizes arsenite ion to arsenate ion and oxidizes the ferrous ion to ferric ion to obtain a fourth acidic solution rich in arsenic;
    iv. regulating a molar ratio of ferric ion: arsenate ion in the fourth acidic solution rich in arsenic between 1.0 and 2.0, by adding a solution rich in ferric ion to obtain a fifth acidic solution rich in arsenic;
    v. adding a portion of a pulp of ferric arsenate and/or scorodite consisting of a solid with an arsenic content higher than 15% and content of less than 54% gypsum recirculated from step x and further consisting of a portion of a 30% wt of ferric arsenate and/or scorodite to the fifth acidic solution rich in arsenic, as the basis for nucleation and growth of particle size and/or ferric arsenate scorodite during precipitation to obtain a first pulp of ferric arsenate and/or scorodite;

vi. heating the first pulp of ferric arsenate and/or scorodite at a temperature between 50 and 90° C.;

vii. adding a second slurry of neutralizer consisting of a neutralizer based on magnesium, calcium and water, reaching a concentration of free acid of between 5 and 33 g/L, to generate a second pulp of ferric arsenate and/or scorodite comprising a sixth acidic solution and impoverished in arsenic, ferric arsenate and/or scorodite and with low content of gypsum;

viii. maintaining the second pulp of ferric arsenate and/or scorodite at the temperature in step vi for a time of between 5 and 48 h;

ix. sending the second pulp of ferric arsenate and/or scorodite up to a stage of solid liquid separation to obtain a pulp of ferric arsenate and/or scorodite consisting of a solid with an arsenic content higher than 15% and content of less than 54% gypsum and sixth acidic solution and impoverished in arsenic; and x. recirculating a portion of the pulp of ferric arsenate and/or scorodite consisting of a solid with an arsenic content higher than 15% and content of less than 54% gypsum to step v.

2. The process of claim 1, wherein the first slurry of neutralizer in step i consists of calcium hydroxide slurry and water.

3. The process of claim 1, wherein the first slurry of neutralizer is added at room temperature.

4. The process of claim 1, wherein the first oxidant used in step ii is hydrogen peroxide.

5. The process of claim 1, wherein the second oxidant used in step iii is sodium chlorite.

6. The process of claim 1, wherein the first oxidant of step ii is added so that 40% of arsenic is oxidized in the second acidic solution rich in arsenic.

7. The process of claim 1, wherein the second oxidant in step iii is added so that 60% of arsenic is oxidized in the third acidic solution rich in arsenic.

8. The process of claim 1, wherein the molar ratio of ferric ion:arsenate ion in step iv is set to 1.2.

9. The process of claim 8, wherein the molar ratio of ferric ion:arsenate ion is adjusted with a solution rich in ferric ion obtained from a leaching magnetite and/or hematite solution.

10. The process of claim 1, wherein the second slurry of step vii contains a 47% by weight of calcium carbonate and a 53% by weight of magnesium carbonate.

11. The process of claim 1, wherein the second slurry of step vii is dolomitic limestone.

12. The process of claim 10, wherein the second slurry of step vii is dolomitic limestone.

* * * * *